Nov. 7, 1972    H. J. LEYSHON    3,702,182
MELTING OF IRON
Filed Dec. 23, 1970

INVENTOR
HUMPHREY JAMES LEYSHON
BY
Steward + Steward
ATTORNEYS 3,702,182
MELTING OF IRON
Humphrey James Leyshon, Birmingham, England, assignor to British Cast Iron Research Association, Alvechurch, Birmingham, England
Filed Dec. 23, 1970, Ser. No. 100,972
Claims priority, application Great Britain, Jan. 23, 1970, 3,388/70
Int. Cl. F27b 1/08
U.S. Cl. 263—29                      10 Claims

ABSTRACT OF THE DISCLOSURE

A cupola furnace for melting iron is provided with combustion chambers for non-solid fuels, e.g. gas oil or gas, to be burnt with air only, disposed around the external wall of the melting zone. The combusted products of this non-solid fuel are injected into an upper stratum of a coke bed, provided in the furnace, to maintain the coke in incandescent condition and provide an initial melting stage of the furnace. Additional external heating means is also supplied to a lower stratum of the coke bed, in order to superheat the initially melted metal. This arrangement ensures efficient combustion of the fuel and obviates the need for using oxygen or oxygen-enriched air for combustion in the initial melting stage.

---

Figures 1, 2:
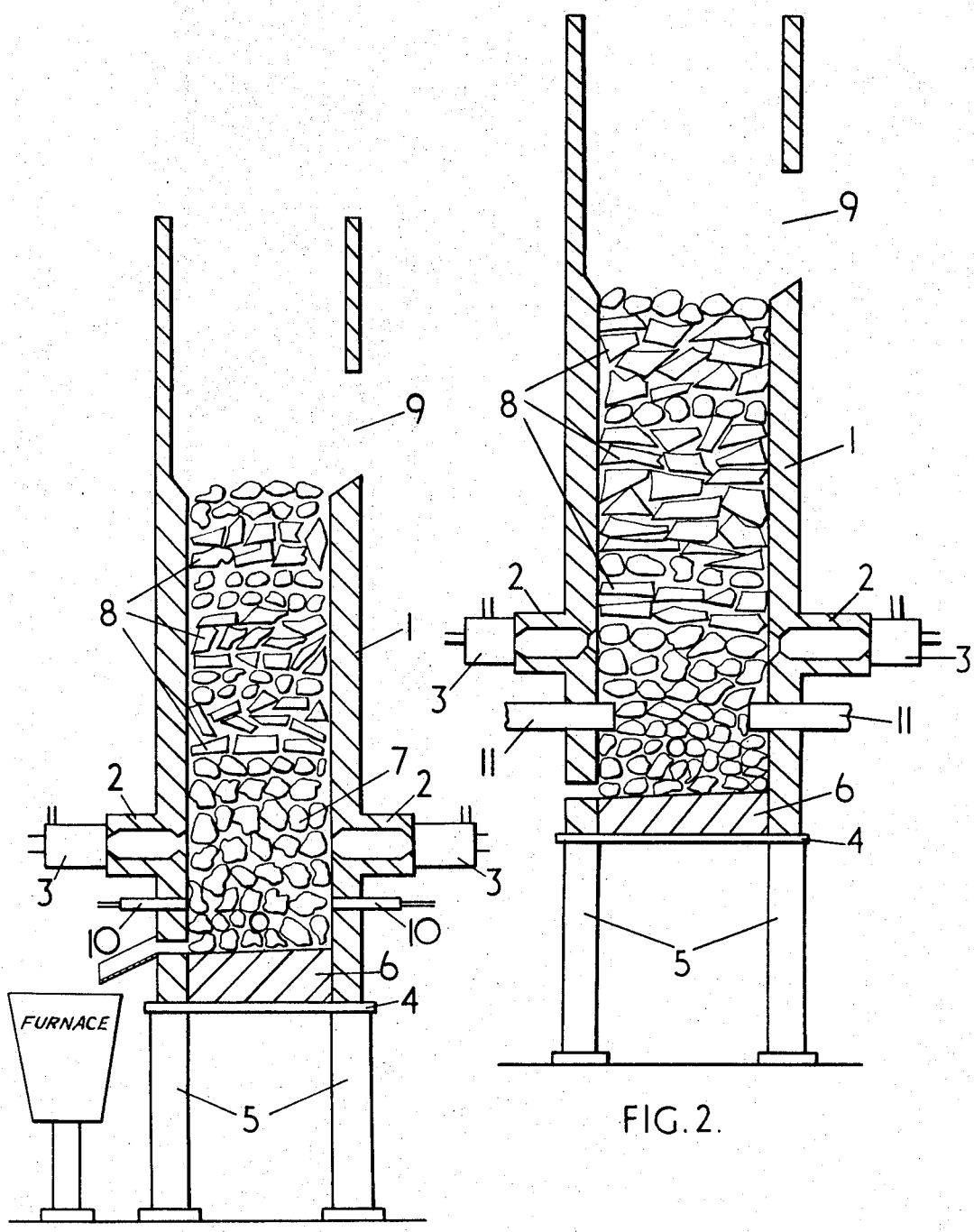

This invention relates to a method of melting iron and to a cupola furnace for carrying out said method.

Furnaces of this type have customarily been charged with pig iron, scrap iron or steel scrap or a mixture of these materials with or without ferro-alloys together with foundry coke to provide the thermal energy needed to produce molten iron.

Attempts have been made to replace the coke as an energy source in cupola furnaces, at least partially by liquid or gaseous fuels. The results have not been wholly successful in practice, in that, when any substantial quantity of coke is replaced by another fuel the temperature of the metal is inadequate to meet the requirements of many foundries producing castings.

In attempts to realise more completely the potential advantages of using liquid or gaseous fuels for melting metal to produce molten iron, means have been sought of overcoming the limitations of conventional oil and gas-fired furnaces which have severely restricted their use. The most serious disadvantages of such furnaces compared with the cupola are:—the thermal efficiency is low; these furnaces cannot be adapted very easily to the requirements for a continuous supply of molten metal; and the cost of the metal stock to produce most grades of iron is considerably higher because the metal cannot be satisfactorily carburised in such furnaces, as it is by contact with the coke in a cupola, so that a greater proportion of more expensive high carbon content material, such as pig iron, must be used in the furnace charges to produce molten iron of the required carbon content.

One attempt in particular, was directed to increasing the thermal efficiency of melting in a cupola furnace itself when using non-solid fuels, by the expedient of supplying the burners for such fuels with oxygen or oxygen-enriched air.

The present invention in contradistinction thereto, provides for melting the metal charge in a cupola furnace, the initial melting zone of which is adapted for firing by liquid or gaseous fuels without having to have recourse to the use of oxygen or oxygen-enriched air to achieve an adequate melting temperature.

According to the inventon the metal charge is initially melted by the hot products of combustion of liquid or gaseous fuels which are burnt with air in separate combustion chambers before said combustion products enter the melting zone, the resulting molten metal then being superheated by some other agency.

The superheating stage may be carried out in various ways, one preferred method being to pass the molten metal through an independently heated contiguous underlying coke bed, the temperature of which is maintained at the required superheat level by injection of oxygen.

In an alternative superheating method, the molten metal is passed through an electrically heated resistance bed, thus dispensing with the need to supply oxygen thereto. Advantageously, coke may be used as the bed material, thus offering the additional advantage of providing carbon for carburisation purposes.

In another method of carrying the invention into practice, the final superheating is performed electrically in an additional third stage; the previous stages or the second stage being obviously conducted at a correspondingly lesser intensity.

The invention also provides a cupola furnace which has been designed to utilise liquid or gaseous fuels more effectively than hitherto for melting ferrous metals. This furnace also overcomes the limitations of existing oil or gas-fired furnaces and provides a continuous supply of molten metal at an adequate temperature for all foundry applications. It also provides a means of carburising the iron within the furnace.

Said cupola furnace is provided externally in the region of the melting zone with a plurality of separate and preferably equi-spaced combustion chambers arranged around its periphery and communicating with an initial or upper stratum of said melting zone. The complete combustion of the fuel with air in said chambers before admission to the melting zone ensures a high thermal efficiency and an adequate melting temperature.

Reference is made to the accompanying drawings, which show diagrammatically two embodiments of cupola furnace according to the invention.

Referring to FIG. 1 the metal is melted by the products of combustion of a liquid or gaseous fuel in a refractory-lined vertical steel shaft 1. Combustion chambers 2 are mounted on the furnace, these being equi-spaced around its periphery adjacent the aforesaid initial or upper melting stratum of the coke bed. Oil or gas burners 3 are attached to the combustion chambers and water-cooled oxygen injectors 10 are cemented into the furnace lining at a lower level or stratum of said bed. The bottom of the steel shaft is attached to a base-plate 4 provided with a drop-bottom door as in a conventional coke-fired cupola. The base plate and shaft are supported on steel column 5.

In operation, a sand bed 6 is laid on the drop-bottom door of the base plate. A coke bed 7 is built up on the sand-bed to a certain level above that of the combustion chambers. This bed is ignited by such means as a gas-air or oil torch and allowed to heat throughout until it is uniformly red in colour. The oil or gas burners are then lit and metal 8 is charged through an opening 9 near the top of the shaft.

The metal melts in the upper stratum of the coke bed adjacent the combustion chambers, and the droplets fall through the lower stratum of the coke bed 7 into the well, from which it may be withdrawn either continuously or intermittently as desired in the same manner as cupola furnaces are operated. As the metal droplets pass through the lower stratum they are superheated by the injection of oxygen into the coke bed through injectors 10.

In the embodiment shown in FIG. 2, the metal is superheated by the passage of electric current between electrodes 11 inserted into the coke bed in the region of the lower stratum, and the electrodes are supplied with current from a suitable transformer. For low power inputs a single phase supply with two electrodes is used, but for larger inputs a 3-phase supply with three electrodes is preferable.

When using oxygen as a means of superheating the metal, coke must be added with the metal charges to replenish the bed coke consumed by it. Some coke is also dissolved by the metal. In addition, a portion of the coke is consumed by the gaseous combustion products of the fuel, the carbon dioxide and water vapour contained therein reacting with the carbon contained in the coke to produce carbon monoxide and hydrogen.

The consumption of carbon by the combustion products in this way adversely affects the thermal efficiency but is not entirely undesirable since the presence of carbon monoxide and hydrogen in the gases passing through the shaft reduces the oxidising power of the gases, leading to smaller losses of iron, silicon and manganese from the metal during pre-heating and melting.

The thermal efficiency of the cupola furnace of the present invention when oil-fired at optimum oxygen flow rates in the superheating stage has been found to be lower than when operated as a conventional cupola, i.e. coke fired, to produce metal at temperatures lower than 1475° C. but of higher efficiency when this temperature was exceeded.

When using electrical means of superheating the metal in a coke bed the quantity of coke added to the charges is only sufficient to allow for that consumed by combustion products of the fuel and that dissolved by the iron.

The cupola furnace of the present invention has been used for producing a range of irons of differing compositions and the metallic charge mixture has varied from all cast iron scrap charges to charges of all steel. The oil fuel used in the initial melting stage, i.e., the upper stratum of the coke bed was a commercial gas oil having an approximate calorific value of 19,600 B.t.u./lb.

When melting charge mixtures of a high carbon equivalent value, there is little or no oxidation losses of the main alloying elements. A charge consisting entirely of cast iron scrap having an analysis, 3.00% T.C. (total carbon), 2.04% Si, 0.36% Mn, 0.120% S and 1.20% P has been melted in a small furnace by the combustion of 14.3 gallons of oil per hour. Additional heat supplied primarily for the superheating of the metal was generated by the charging of four pounds of ordinary foundary coke with every one hundred pounds of metal, and injecting 15 cubic feet of oxygen per minute into the well of the furnace. For the formation of a fluid slag that could be easily tapped from the furnace, 2 lb. of limestone were also charged with every 100 lb. of metal. Under these conditions of operation iron was melted at a rate of 0.94 tons/h., and at a temperature of 1435° C. The composition of the metal produced was as follows: 3.00% T.C., 2.03% Si, 0.37% Mn, 0.132% S and 1.26% P. It was also found that the coke charge required to produce the above temperature was approximately one third of the quantity required using the furnace in conventional coke operation.

When melting charge mixtures containing varying proportions of steel, including all steel charges, the iron is able to absorb carbon from the coke during melting and superheating in a similar manner to iron melted in a cupola furnace. An example of such operation is given. The furnace was charged with a metal mixture of 80 percent steel scrap and 20 percent cast iron scrap with an addition of ferrosilicon to provide a charge analysis of 0.82% T.C., 0.94% Si, 0.82% Mn, 0.050% S and 0.25% P. Oil was burnt at a rate of 14.7 gallons per hour, and, to allow for the solution of a portion of the coke fuel in the metal, 6.5 lb. of coke were charged with every 100 lb. of metal and burnt by the injection into the well of the furnace of 20 cubic feet per minute of oxygen. Again 2 lb. of limestone were charged with every 100 lb. metal for the formation of a fluid slag. Under these conditions of operation 0.97 ton of metal were produced per hour at a temperature of 1520° C. The iron produced had the following composition: 2.66% T.C., 0.75% Si, 0.36% Mn, 0.094% S and 0.24% P.

As in the case of charge mixtures consisting of cast iron scrap, the coke charge required to produce this temperature is approximately one third of that required for conventional operation.

The furnace and melting process carried out within it, as described above, provide a means of utilising liquid or gaseous fuels as the principal source of energy for producing molten iron at a temperature suitable for all iron founding purposes. Such fuels may, alternatively, also be used as the principal source of energy for pre-melting the iron only in the two stages previously referred to; the final superheating being carried out in an electric furnace of conventional pattern. In view of the relative expense of electric heating such a measure is adapted to afford economic advantages while retaining the convenience of the use of electrical energy for the final superheating and holding operation which is necessary when a supply of molten iron at the right temperature and composition is to be supplied to a foundry.

I claim:

1. A method of producing superheated molten iron in a cupola furnace from ferrous metal scrap, which comprises the steps of forming a charge of said scrap metal and feeding it to an opening in the upper part of said furnace, providing in said furnace a bed of incandescent coke forming a melting zone in said furnace beneath said opening, said coke bed having an upper stratum forming an initial melting zone, injecting into said upper stratum the hot, substantially completely combusted products of non-solid fuels burnt with air in at least one combustion chamber separate from but immediately adjacent said upper stratum, said coke bed also having a contiguous underlying stratum heated independently of said upper stratum to provide a higher temperature than in said upper stratum, whereby said scrap metal charge is caused to be first melted by contact with said upper coke bed stratum and then to flow downwardly into contact with said underlying coke bed stratum to be superheated by the latter, and withdrawing said superheated molten metal from beneath said underlying stratum.

2. A method as claimed in claim 1, in which the non-solid fuel is gas oil.

3. A method of producing superheated molten iron in a cupola furnace from ferrous scrap metal, which comprises the steps of forming a charge of said metal scrap admixed with coke and feeding it to an opening in the upper part of said furnace, providing in said furnace a bed of incandescent coke forming a melting zone in said furnace beneath said opening, said coke bed having an upper stratum forming an initial melting zone, injecting into said upper stratum the hot, substantially completely combusted products of non-solid fuels burnt with air in a plurality of combustion chambers equi-spaced about the periphery of said furnace; separate from but immediately adjacent said upper stratum, said coke bed also having a contiguous underlying stratum heated independently of said upper stratum to provide a higher temperature than in said upper stratum, whereby said scrap metal charge is caused to be first melted by contact with said upper coke bed stratum and then to flow downwardly into contact with said underlying coke bed stratum to be superheated by the latter, and withdrawing said superheated molten metal from beneath said underlying stratum.

4. A method as claimed in claim 3, wherein said underlying stratum includes an electrically heated resistance bed.

5. A method as claimed in claim 4, wherein a portion of said underlying coke bed stratum comprises said electrically heated resistance bed.

6. A method as claimed in claim 1, which further includes transferring said molten metal to an electric furnace for final superheating.

7. A cupola furnace for production of superheated molten iron from ferrous metal scrap, which comprises a refractory lined vertical tubular steel shaft having a bottom wall closing its lower end and means adjacent said bottom wall for tapping said furnace to withdraw molten metal, an opening at the top of said shaft for charging scrap metal to be melted, a coke bed supported on said bottom wall and extending up to a level below that of said charging opening, a plurality of separate combustion chambers mounted immediately adjacent and externally of said shaft below said charging opening, duct means communicating each of said chambers directly with the interior of said shaft at a level corresponding to an upper stratum of said coke bed, means for feeding non-solid fuel to said combustion chambers, and means for introducing supplemental heat to an underlying stratum of said coke bed.

8. A cupola furnace as claimed in claim 7, which further includes an electric furnace immediately adjacent said tap means for receiving and holding molten metal withdrawn from said cupola furnace.

9. A cupola furnace as claimed in claim 7, wherein said supplemental heat means comprises a plurality of water-cooled oxygen injectors extending through the wall of said furnace at a level corresponding to said underlying stratum of said coke bed.

10. A cupola furnace as claimed in claim 7, wherein said supplemental heating means comprises a plurality of electrodes extending through the wall of said furnace in insulated relation thereto at a level corresponding to the underlying stratum of said coke bed and into contact with said bed.

References Cited

UNITED STATES PATENTS

| | | | |
|---|---|---|---|
| 2,694,097 | 11/1954 | Collin | 13—2 |
| 3,140,864 | 7/1964 | Lellep | 263—29 |
| 656,600 | 8/1900 | Doolittle | 13—2 |
| 749,461 | 1/1904 | Stevens et al. | 13—2 |
| 3,427,367 | 2/1969 | Kiehl | 263—29 |
| 722,254 | 3/1903 | Ruthenburg | 13—2 |

JOHN J. CAMBY, Primary Examiner

U.S. Cl. X.R.

13—2; 266—25